(12) United States Patent
Hirayama et al.

(10) Patent No.: US 7,826,371 B2
(45) Date of Patent: Nov. 2, 2010

(54) FLOW CONTROL METHOD AND RECEIVING END DEVICE

(75) Inventors: Ryouji Hirayama, Fukuoka (JP); Hiroaki Fujimura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 12/031,791

(22) Filed: Feb. 15, 2008

(65) Prior Publication Data
US 2008/0232251 A1    Sep. 25, 2008

(30) Foreign Application Priority Data
Mar. 20, 2007    (JP) .............................. 2007-072198

(51) Int. Cl.
*H04L 12/26*    (2006.01)
(52) U.S. Cl. .................................... 370/236.1; 370/412
(58) Field of Classification Search ........................ None
See application file for complete search history.

(56) References Cited

U.S. PATENT DOCUMENTS

| 6,031,821 A * | 2/2000 | Kalkunte et al. ............. 370/235 |
| 6,170,022 B1 * | 1/2001 | Linville et al. ................. 710/29 |
| 2003/0123393 A1 * | 7/2003 | Feuerstraeter et al. ....... 370/235 |

FOREIGN PATENT DOCUMENTS

| JP | 7-283817 | 10/1995 |
| JP | 2003-218927 | 7/2003 |
| JP | 2005-057407 | 3/2005 |
| JP | 2005-210385 | 8/2005 |
| JP | 2005-236447 | 9/2005 |
| JP | 2006-087147 | 3/2006 |
| JP | 2007-96910 | 4/2007 |
| JP | 2007-194732 | 8/2007 |

OTHER PUBLICATIONS

IEEE Std 802.3x-1997, IEEE Standards for Local and Metropolitan Area Networks, 1997, IEEE, ISBN: 1-55937-905-7, pp. Title, 163,164,313,314.*
Notice of Rejection with partial translation dated Jun. 9, 2009, from corresponding Japanese Application JP 2007-072198.
Kohei Shimoto, et al., "Admission and flow control based on measurements of instantaneous utilization", Dec. 7, 1995, pp. 1-9, NTT Network Service Systems Laboratories, Tokyo, Japan.

* cited by examiner

*Primary Examiner*—Steven H Nguyen
*Assistant Examiner*—Alex Skripnikov
(74) *Attorney, Agent, or Firm*—Fujitsu Patent Center

(57) ABSTRACT

A method and device for a flow control over network devices includes a receiving end device and a transmitting end device. The receiving end device monitors an input buffer and determines whether an available space in the input buffer is less than a predetermined threshold. Upon determining that the available space in the input buffer is less than the predetermined threshold, the receiving end device sets, in a MAC control code, an identifier that indicates an extended pause frame, and transmits the extended pause frame to the transmitting end device. The receiving end device also sets, in a stop time period field, output control data to control data transmission for each class based on the available space in the input buffer. Based on the output control data of the extended pause frame transmitted from the receiving end device, the transmitting end device exercises band control for each priority class.

4 Claims, 11 Drawing Sheets

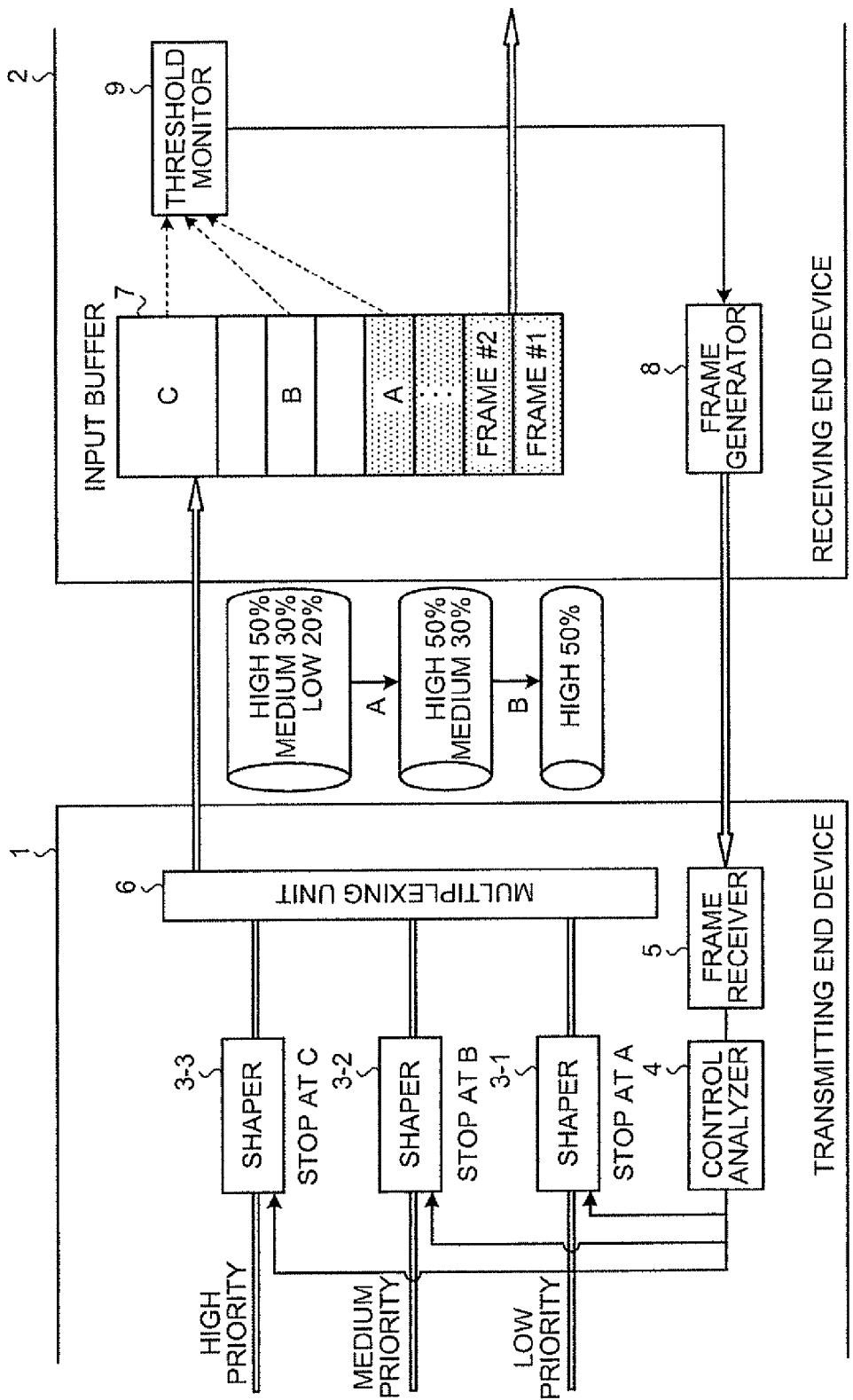

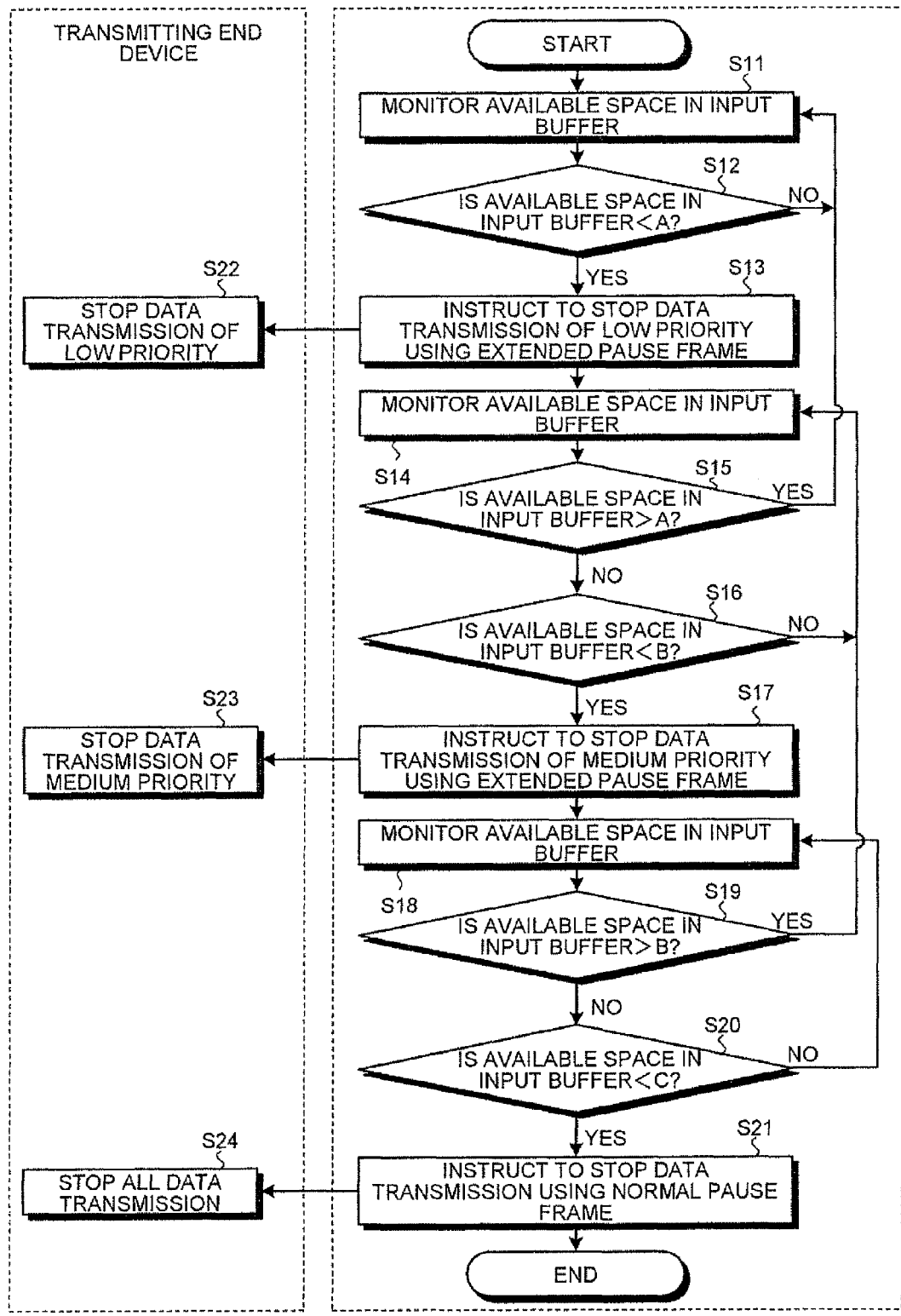

FIG.6

| PREAMBLE | SFD | PAUSE DESTINATION ADDRESS 01-80-C2-00-00-01 | SOURCE ADDRESS | MAC CONTROL TYPE 0x8808 | MAC CONTROL OPERATION CODE PAUSE opcode=0x8002 | INPUT BUFFER-PERMISSIBLE BAND VALUE (PERCENT) | FCS |

DEFINITION OF THIS PORTION IS EXTENDED TO ADD CONTROL DATA

FIG.11

| PREAMBLE | SFD | PAUSE DESTINATION ADDRESS 01-80-C2-00-00-01 | SOURCE ADDRESS | MAC CONTROL TYPE 0x8808 | MAC CONTROL OPERATION CODE PAUSE opcode=0x8003 | CONTROL TARGET CLASS | BAND SETTING VALUE | FCS |

DEFINITION OF THIS PORTION IS EXTENDED TO ADD CONTROL DATA (covers MAC CONTROL OPERATION CODE, CONTROL TARGET CLASS, BAND SETTING VALUE)

FLOW CONTROL METHOD AND RECEIVING END DEVICE

BACKGROUND OF THE INVENTION

1. Field of the Invention

The present invention relates to a flow control method and a receiving end device of an Ethernet (registered trademark) transmitter, and, more particularly to a flow control method and a receiving end device that treat as a control target, data that includes a set priority.

2. Description of the Related Art

When performing data communication between two network devices using Ethernet (registered trademark) transmission, if an input speed of data into a receiving end device exceeds a processing speed of the receiving end device, a frame wait and a frame rejection of an input buffer are likely to occur. For preventing the frame wait and the frame rejection, a conventional flow control, which uses a pause frame, is disclosed in Japanese Patent Application Laid-open No. 2005-210385. In the conventional flow control using the pause frame, if a number of frames accumulated in the input buffer of the receiving end device exceeds a predetermined threshold, the receiving end device transmits the pause frame to a transmitting end device. Upon receiving the pause frame, the transmitting end device stops an output for a predetermined time period. A stop time period is allocated in the pause frame as a pause time. Upon lapse of the pause time specified in the pause frame, the transmitting end device releases an output stop (pause). The transmitting end device also releases the output stop if the receiving end device transmits the pause frame in which the pause time is "0".

A shaping device, as disclosed in Japanese Patent Application Laid-open No. 2006-87147, provides a queuing priority for packets and stores the packets of a high priority in the buffer, thereby preventing rejection of the packets of the high priority. Further, by setting the high priority for the packets that are highly important, the shaping device prevents rejection of the important packets.

However, in the flow control, which uses the conventional pause frame mentioned earlier, regardless of high priority data or low priority data, the entire transmission stops during the predetermined time period. Due to this, maintenance of a service class is adversely affected. In other words, in a flow control method using the conventional pause frame, a priority-based control cannot be exercised.

The shaping device, which is disclosed in Japanese Patent Application Laid-open No. 2006-87147, does not control an available space or capacity in the input buffer of a receiving end device. Due to this, an output control cannot be carried out based on the available space in the input buffer of the receiving end device.

SUMMARY OF THE INVENTION

It is an object of the present invention to at least partially solve the problems in the conventional technology.

According to an aspect of the present invention, a method for executing flow control of data having a plurality of priority classes between a receiving end device and a transmitting end device, includes monitoring an input buffer to determine whether an available space in the input buffer is less than a predetermined threshold, wherein the input buffer is disposed in the receiving end device and storing therein the data from the transmitting end device; transmitting an extended pause frame having a MAC control code field and a stop time period field to the transmitting end device in the receiving end device upon determining that the available space in the input buffer is less than the predetermined threshold, wherein an identifier indicating the extended pause frame is set in the MAC control code field, and output control data for each of the priority classes is set in the stop time period field based on the available space in the input buffer; and performing band control for each of the priority classes based on the output control data in the stop time period field of the extended pause frame in the transmitting end device.

According to another aspect of the present invention, a receiving end device is for receiving data having a plurality of priority classes, transmitted from a transmitting end device performing a band control for each of the priority classes based on output control data in an extended pause frame having a MAC control code field and a stop time period field. The receiving end device includes a threshold monitor that monitors an input buffer that stores therein the data from the transmitting device and determines whether an available space in the input buffer is less than a predetermined threshold; and a frame generator that sets, upon the threshold monitor determining that the available space in the input buffer is less than the predetermined threshold, in the MAC control code field, an identifier indicating the extended pause frame sent from the receiving end device, and setting, in the stop time period field, control data for each of the priority classes based on the available space in the input buffer, and transmitting the extended pause frame to the transmitting end device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a functional block diagram of an example of a communication system according to a first embodiment of the present invention;

FIG. 2 is a schematic of an example of a normal pause frame;

FIG. 3 is a schematic of an example of a pause frame extension according to the first embodiment;

FIG. 4 is a flowchart of a flow control process according to the first embodiment;

FIG. 6 is a schematic of an example of a pause frame extension according to the second embodiment;

FIG. 11 is a schematic of an example of a pause frame extension according to the fourth embodiment.

DETAILED DESCRIPTION OF THE PREFERRED EMBODIMENTS

Figure 5:
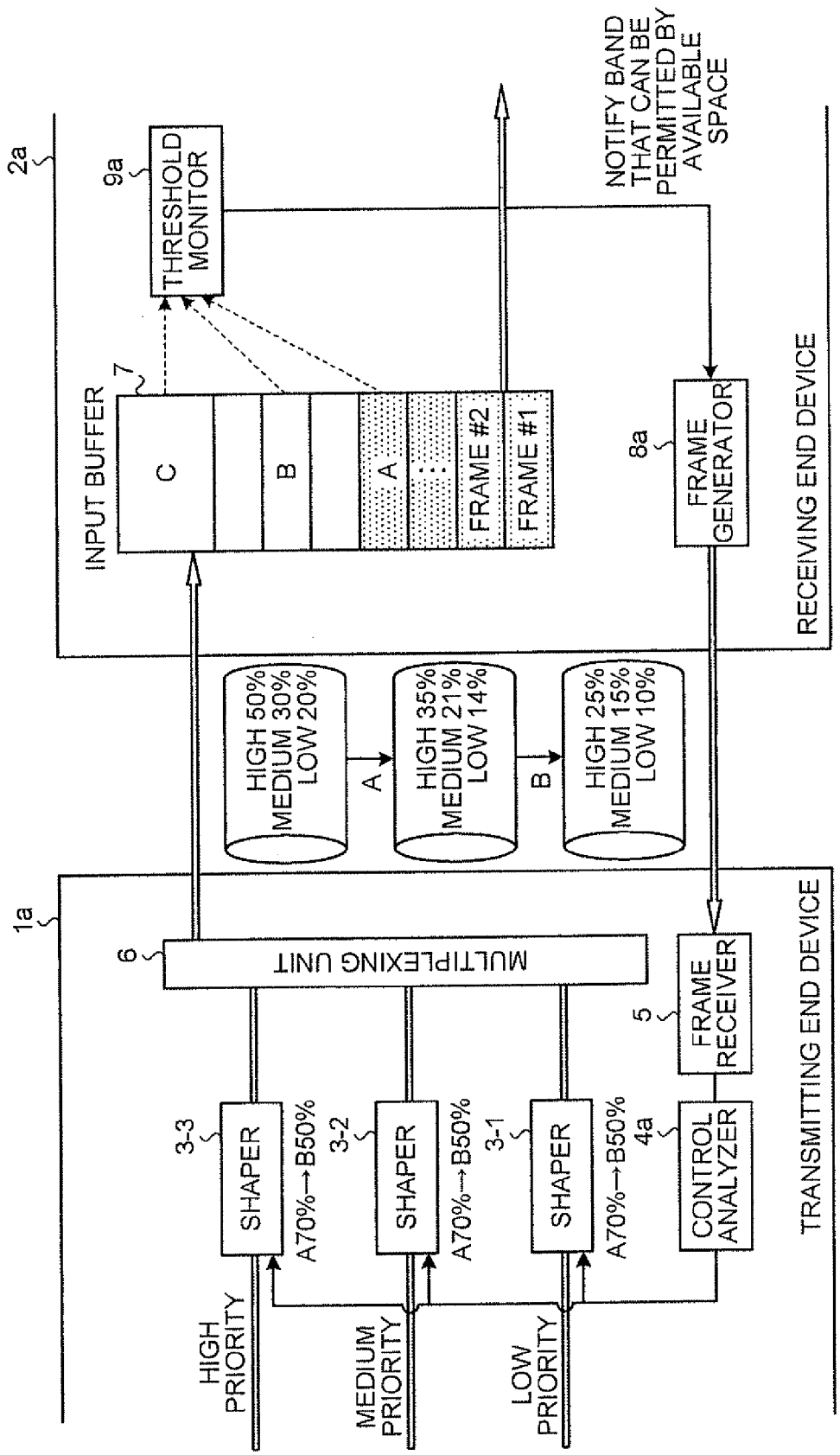
FIG. 5 is a functional block diagram of an example of a communication system according to a second embodiment of the present invention.

Exemplary embodiments of a flow control method and a receiving end device according to the present invention are explained below in detail with reference to the accompanying drawings.

FIG. 1 is a functional block diagram of a communication system, which includes a receiving end device according to a first embodiment of the present invention. In the first embodiment, a receiving end device 2 is explained as an example of the receiving end device according to the present invention.

As shown in FIG. 1, a transmitting end device 1 includes shapers 3-1 to 3-3 that carry out a band control of transmission data, a control analyzer 4 that analyzes control data transmitted from the receiving end device 2, a frame receiver 5 that receives a frame transmitted from the receiving end device 2, and a multiplexing unit 6 that multiplexes the transmission data.

The receiving end device 2 includes an input buffer 7 that stores therein received data, a frame generator 8 that generates the frame that is transmitted to the transmitting end device 1 and a threshold monitor 9 that monitors a stored data amount in the input buffer 7.

FIG. 2 is a schematic of an example of a normal or regular pause frame. The normal pause frame, which is used for stopping a data transmission, is a control frame that is specified in the IEEE (Institute of Electrical and Electronic Engineers) standard 802.3x. As shown in FIG. 2, the normal pause frame includes a preamble, a start frame delimiter (SFD), a destination address (an exclusive address that indicates a pause frame), a source address (an address of the receiving end device 2 in the first embodiment), a MAC (Media Access Control) control type, a MAC control operation code, a stop time period, and a frame check sequence (FCS).

In the normal pause frame, an exclusive address 01-80-C2-00-00-01, which indicates the pause frame, is set as the destination address, and a numerical value that indicates a MAC control frame is set in a MAC control type field. "0x0001", which is an operation code (opcode) that indicates a pause, is set as the MAC control operation code. An output stop time period (a time period during which an output of the transmission data is stopped) is set in a stop time period field.

In the first embodiment, definitions of a MAC control operation code field and a stop time period field of the normal pause frame are extended to allocate new control data. FIG. 3 is a schematic of an example of an extended pause frame according to the first embodiment. In the first embodiment, the pause frame, which includes the extended MAC control operation code field and the extended stop time period field, is called an extended pause frame. Fields other than the MAC control operation code field and the stop time period field are similar to the respective fields in the normal pause frame.

In the extended pause frame according to the first embodiment, a numerical value such as 0x8003, which indicates the extended pause frame, is set as the opcode in the MAC control operation code field. The numerical value "0x8003" is only an example, and any numerical value, which is not redundant with an already existing opcode, can be used.

In the extended pause frame according to the first embodiment, the stop time period field of the normal pause frame is converted into a control target class field of the extended pause frame. The control target class field specifies the control target class to stop the data transmission. Thus, using the control target class field enables to instruct an output stop for each priority class. A priority class indicates a priority of the data to be transmitted. Classes of three levels, which are indicated by "high priority", "medium priority", and "low priority", are used in the first embodiment. Accordingly, numerical values, which identify the three classes, are set in the control target class field. Although three classes are explained in the first embodiment, two levels or four levels can also be used and a number of levels of the classes is not specifically limited.

In the first embodiment, the priority of the transmitting data is classified into three levels before inputting the transmission data into the shapers 3-1 to 3-3 of the transmitting end device 1. Data of "low priority" is input into the shaper 3-1, data of "medium priority" is input into the shaper 3-2, and data of "high priority" is input into the shaper 3-3 for each priority class.

A flow control method according to the first embodiment is explained next. FIG. 4 is a flowchart of a flow control process according to the first embodiment. In the first embodiment, three types of thresholds are prior set with respect to an available space of the input buffer 7 of the receiving end device 2. The threshold monitor 9 stores therein the three types of thresholds. In the first embodiment, A, B, and C are the three types of thresholds such that A>B>C. The thresholds represent data to determine a transmission stop for each priority class. Because three levels of the classes are used in the first embodiment, the three types of thresholds are used. However, the same number of thresholds as a number of levels of the classes can be set if three levels of the classes are not used.

As shown in FIG. 4, the threshold monitor 9 first monitors the available space (remaining capacity) in the input buffer 7 (step S11). Next, the threshold monitor 9 determines whether the available space in the input buffer 7 is less than the threshold A (step S12). Upon the threshold monitor 9 determining that the available space in the input buffer 7 is greater than the threshold A (No at step S12), the flow control process returns to step S11 and the threshold monitor 9 continues to monitor the available space in the input buffer 7.

Upon determining that the available space in the input buffer 7 is less than the threshold A (Yes at step S12), the threshold monitor 9 instructs the frame generator 8 to transmit the extended pause frame for instructing the output stop of "low priority" data. The frame generator 8 sets "0x8003" (opcode that indicates the extended pause frame) in the MAC control operation code field, sets in the control target class field, an identifier that indicates "low priority" class, and transmits the extended pause frame to the transmitting end device 1 (step S13).

Next, the threshold monitor 9 continues to monitor the available space (remaining capacity) in the input buffer 7 (step S14). Next, the threshold monitor 9 determines whether the available space in the input buffer 7 is greater than the threshold A (step S15). Upon the threshold monitor 9 determining that the available space in the input buffer 7 is greater than the threshold A (Yes at step S15), the flow control process returns to step S11. Upon determining that the available space in the input buffer 7 is less than the threshold A (No at step S15), the threshold monitor 9 determines whether the available space in the input buffer 7 is less than the threshold B (step S16). Upon the threshold monitor 9 determining that the available space in the input buffer 7 is greater than the threshold B (No at step S16), the flow control process returns to step S14 and the threshold monitor 9 continues to monitor the available space in the input buffer 7.

Upon determining that the available space in the input buffer 7 is less than the threshold B (Yes at step S16), the threshold monitor 9 instructs the frame generator 8 to transmit the extended pause frame for instructing the output stop of "medium priority" data. The frame generator 8 sets "0x8003" in the MAC control operation code field, sets in the control target class field, the identifier that indicates "medium priority" class, and transmits the extended pause frame to the transmitting end device 1 (step S17).

Next, the threshold monitor 9 continues to monitor the available space (remaining capacity) in the input buffer 7 (step S18). Next, the threshold monitor 9 determines whether the available space in the input buffer 7 is greater than the threshold B (step S19). Upon the threshold monitor 9 determining that the available space in the input buffer 7 is greater than the threshold B (Yes at step S19), the flow control process returns to step S14. Upon determining that the available space in the input buffer 7 is less than the threshold B (No at step S19), the threshold monitor 9 determines whether the available space in the input buffer 7 is less than the threshold C (step S20). Upon the threshold monitor 9 determining that the available space in the input buffer 7 is greater than the threshold C (No at step S20), the flow control process returns to step S18 and the threshold monitor 9 continues to monitor the available space in the input buffer 7.

Upon determining that the available space in the input buffer 7 is less than the threshold C (Yes at step S20), the threshold monitor 9 instructs the frame generator 8 to transmit the normal pause frame. The frame generator 8 sets "0x0001" (opcode that indicates the normal pause frame) in the MAC control operation code field, sets the stop time period to a predetermined time period, and transmits the normal pause frame to the transmitting end device 1 (step S21). The predetermined time period is not specifically restricted, and transmission of the normal pause frame can be similarly set to a communication status. A string of the flow control process ends at step S21. The threshold monitor 9 again exercises the flow control (process from step S11) after a lapse of the stop time period.

Upon receiving the extended pause frame that is transmitted at step S13, the transmitting end device 1 stops data transmission of "low priority" class (step S22). To be specific, first, the frame receiver 5 receives the extended pause frame. The control analyzer 4 analyzes contents of the received extended pause frame, determines to stop the output of "low priority" class, and instructs the shaper 3-1 to stop the output. Upon receiving an output stop instruction, the shaper 3-1 stops the output.

Upon receiving the extended pause frame transmitted at step S17, the transmitting end device 1 stops data transmission of "medium priority" class (step S23). To be specific, the frame receiver 5 first receives the extended pause frame. The control analyzer 4 analyzes the contents of the received extended pause frame, determines to stop the output of "medium priority" class, and instructs the shaper 3-2 to stop the output. Upon receiving the output stop instruction, the shaper 3-2 stops the output.

Upon receiving the normal pause frame that is transmitted at step S21, the transmitting end device 1 stops data transmission of all the classes during the time period that is specified by the stop time period (step S24) To be specific, first, the frame receiver 5 receives the normal pause frame. The control analyzer 4 analyzes the contents of the received normal pause frame, reads the stop time period, and instructs the shapers 3-1 to 3-3 to stop the output. Upon receiving the output stop instruction, the shapers 3-1 to 3-3 stop the respective output. The transmitting end device 1 continues to stop the output of the shapers 3-1 to 3-3 until the read stop time period has lapsed.

Carrying out "release of the output stop" of the extended pause frame is explained below. A code, which indicates "release of the output stop", is further defined as the MAC control operation code of the extended pause frame, and the code is set as the MAC control operation code. Setting a class, which carries out "release of the output stop", in the control target class enables to transmit the extended pause frame that indicates a release of the output stop. The stop time period cannot be specified in the extended pause frame. However, upon instructing the output stop, the extended pause frame, which includes the set code that indicates "release of the output stop", is transmitted after a lapse of the time period during which the output is to be stopped. Due to this, a control is enabled that is similar to specifying the stop time period. When carrying out "release of the output stop" for all the priority classes, a release frame, which is the normal pause frame that includes the stop time period "0", can also be transmitted.

In the first embodiment mentioned earlier, the MAC control operation code of the normal pause frame is extended to add the code that indicates the extended pause frame. Further, the stop time period field is converted into the "control target class" field to specify a priority class to stop the output. Due to this, based on the available space in the input buffer 7 and the priority class of the transmission data, a precise flow control can be exercised.

FIG. 5 is a functional block diagram of a communication system, which includes the receiving end device according to a second embodiment of the present invention. As shown in FIG. 5, apart from replacing the control analyzer 4 of the transmitting end device 1 according to the first embodiment by a control analyzer 4a, a transmitting end device 1a according to the second embodiment is similar to the transmitting end device 1 according to the first embodiment. Apart from replacing the frame generator 8 and the threshold monitor 9 of the receiving end device 2 according to the first embodiment by a frame generator 8a and a threshold monitor 9a respectively, a receiving end device 2a according to the second embodiment is similar to the receiving end device 2 according to the first embodiment. Components, which include functions that are similar to the functions in the first embodiment, are indicated by the same reference numerals, and a detailed description of such components will not be repeated here.

The MAC control operation code field and the stop time period field of the normal pause frame are extended also in the second embodiment to add new control data. FIG. 6 is a schematic of an example of the pause frame extension according to the second embodiment.

In the extended pause frame according to the second embodiment, a numerical value such as "0x8002", which indicates the extended pause frame, is set as the opcode that is used in the MAC control operation code field. The numerical value "0x8002" is merely an example, and any numerical value, which differs from an already existing opcode, can be used.

In the extended pause frame according to the second embodiment, the stop time period field of the normal pause frame is replaced by an input buffer-permissible band value field of the extended pause frame. In the input buffer-permissible band value field, the available space in the input buffer is set in percentage. The transmitting end device 1a, which receives the extended pause frame according to the second embodiment, reduces the output of each class to the percentage that is set as the respective input buffer-permissible band value. Similarly as in the first embodiment, the class in the second embodiment indicates a priority. In the second embodiment, three levels of "high priority", "medium priority", and "low priority" are used as the priority classes.

Similarly as in the first embodiment, the class division is carried out also in the second embodiment before inputting the transmission data into the shapers 3-1 to 3-3 of the transmitting end device 1a. Data of "low priority" is input into the shaper 3-1, data of "medium priority" is input into the shaper 3-2, and data of "high priority" is input into the shaper 3-3.

Figure 7:
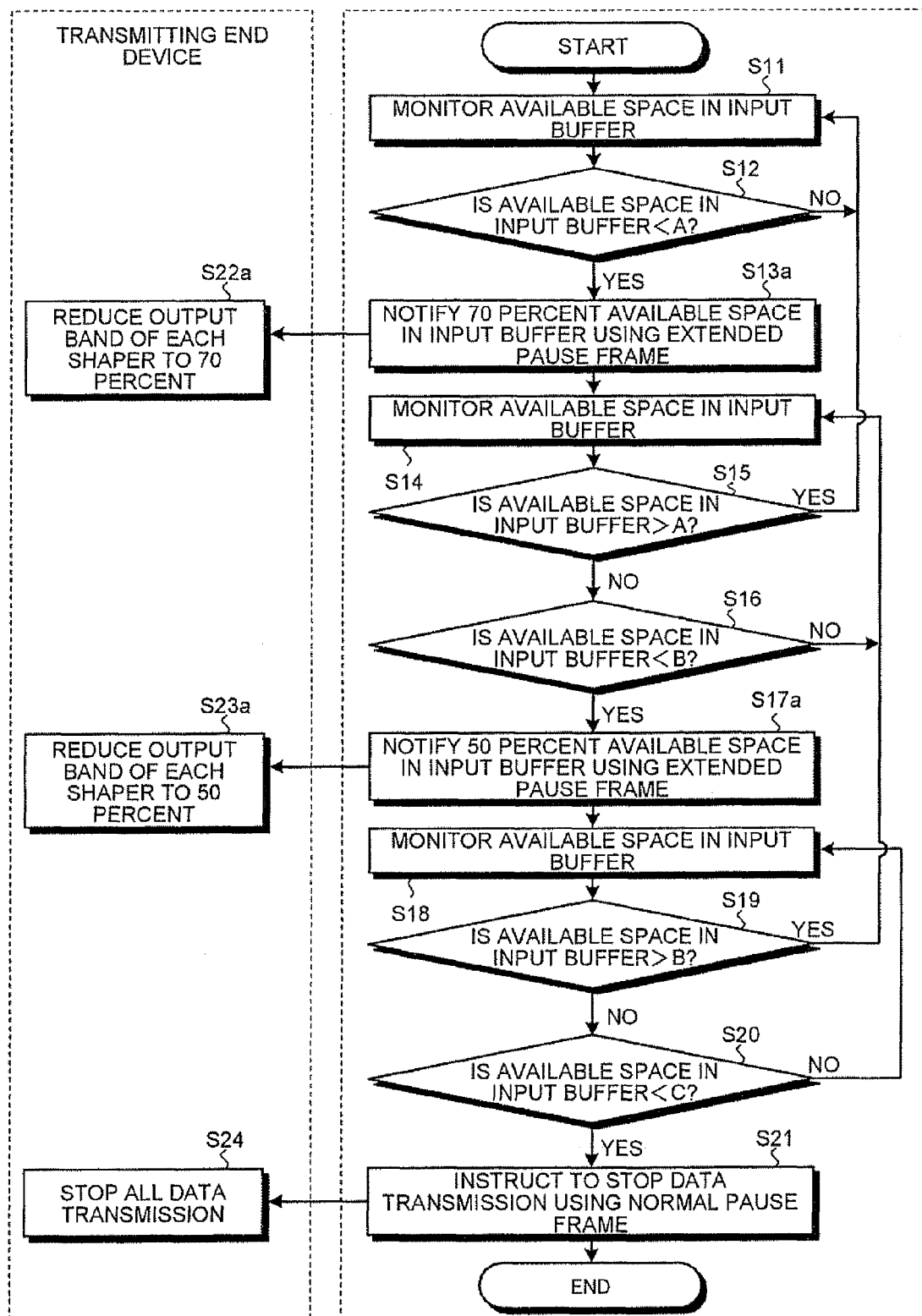
FIG. 7 is a flowchart of a flow control process according to the second embodiment.

A flow control method according to the second embodiment is explained next. FIG. 7 is a flowchart of a flow control process according to the second embodiment. In the second embodiment, similarly as in the first embodiment, the three types of thresholds are prior set with respect to the available space in the input buffer 7 of the receiving end device 2a. The threshold monitor 9a stores therein the three types of thresholds. A, B, and C are the three types of thresholds such that A>B>C. In the explanation below, it is assumed that the available space or capacity in the input buffer 7 corresponds to 70 percent (with respect to a total capacity of the input buffer 7) when the input buffer 7 is being used until the threshold A, and that the available space in the input buffer 7 corresponds to 50 percent when the input buffer 7 is being used until the threshold B. However, the numerical values mentioned earlier are mere examples, and any numerical values can be set as the percentages of the available space in the input buffer 7 that correspond to the threshold A and the threshold B respectively.

A portion of the flow control process, which differs from the respective portion of the flow control process in the first embodiment, is explained next. Step S11 and step S12 of the flow control process are similar to step S11 and step S12 respectively of the flow control process according to the first embodiment. Upon determining, at step S12, that the available space in the input buffer 7 is less than the threshold A (Yes at step S12), the threshold monitor 9a instructs the frame generator 8a to transmit the extended pause frame for instructing to reduce the output to 70 percent of the current output. The frame generator 8a sets "0x8002" (opcode that indicates the extended pause frame) in the MAC control operation code field, sets a numerical value of 70 percent in the input buffer-permissible band value field, and transmits the extended pause frame to the transmitting end device 1a (step S13a).

Steps S14 to S16 of the flow control process are similar to steps S14 to S16 respectively of the flow control process according to the first embodiment. Upon determining, at step S16, that the available space in the input buffer 7 is less than the threshold B (Yes at step S16), the threshold monitor 9a instructs the frame generator 8a to transmit the extended pause frame for instructing to reduce the output to 50 percent of the current output. The frame generator 8a sets "0x8002" in the MAC control operation code field, sets a numerical value of 50 percent in the input buffer-permissible band value field, and transmits the extended pause frame to the transmitting end device 1a (step S17a). Steps S18 to S21 of the flow control process are similar to steps S18 to S21 of the flow control process according to the first embodiment.

Upon receiving the extended pause frame that is transmitted at step S13a, the transmitting end device 1a reduces a data transmission amount of all the classes to 70 percent (step S22a). To be specific, first the frame receiver 5 receives the extended pause frame. The control analyzer 4a analyzes the contents of the received extended pause frame, determines that the extended pause frame indicates the instruction to reduce the data transmission amount of all the classes to 70 percent, and sets the respective output bands in the shapers 3-1 to 3-3 to 70 percent of the respective current output. The shapers 3-1 to 3-3 control the respective output in the set output bands.

For example, it is assumed that a total output data amount of the shapers 3-1 to 3-3, before being reduced to 70 percent, is 100 percent. It is further assumed that in the total output data amount, the output from the shaper 3-3 is 50 percent, the output from the shaper 3-2 is 30 percent, and the output from the shaper 3-1 is 20 percent. Upon receiving the instruction to reduce the output to 70 percent, the control analyzer 4a sets the respective bands such that the output of the shaper 3-3 becomes 35 percent (50 percent×0.7), the output of the shaper 3-2 becomes 21 percent (30 percent×0.7), and the output of the shaper 3-1 becomes 14 percent (20 percent×0.7).

Upon receiving the extended pause frame that is transmitted at step S17a, the transmitting end device 1a reduces the data transmission amount of all the classes to 50 percent (step S23a). To be specific, first the frame receiver 5 receives the extended pause frame. The control analyzer 4a analyzes the contents of the received extended pause frame, determines that the extended pause frame indicates the instruction to reduce the data transmission amount of all the classes to 50 percent, and sets the respective bands in the shapers 3-1 to 3-3 to 50 percent of the current output bands. The shapers 3-1 to 3-3 control the output within the set output bands. Step S24 of the flow control process is similar to step S24 of the flow control process according to the first embodiment.

The structure of the communication system shown in FIG. 5 is used in the second embodiment. However, functions of the frame generator 8a and the threshold monitor 9a of the receiving end device 2a according to the second embodiment can be added to the respective functions of the frame generator 8 and the threshold monitor 9 of the receiving end device 2 according to the first embodiment. Similarly, a function of the control analyzer 4a of the transmitting end device 1a according to the second embodiment can also be added to the control analyzer 4 of the transmitting end device 1 according to the first embodiment. When adding the functions in the second embodiment to the respective functions in the first embodiment, the MAC control operation code that is used in the extended pause frame in the first embodiment and the MAC control operation code that is used in the extended pause frame in the second embodiment are defined as different numerical values (for example, the extended pause frame in the first embodiment is set to "0x8003" and the extended pause frame in the second embodiment is set to "0x8002"). Next, the threshold monitor 9a of the receiving end device 2a selects to transmit any one of the extended pause frames. After selecting the extended pause frame, the threshold monitor 9a executes the flow control process that is similar to the flow control process according to the first embodiment or according to the second embodiment.

In the second embodiment mentioned earlier, the MAC control operation code of the normal pause frame is extended to add the code indicates the extended pause frame. Further, the stop time period field is replaced by the "input buffer-permissible band value field" to specify the percentage to reduce the output. Due to this, a precise flow control corresponding to the available space in the input buffer 7 can be exercised. Further, using an easy operation of whether to stop the output, the transmitting end device 1a can exercise an output control of a transmitting end for each class.

Figure 8:
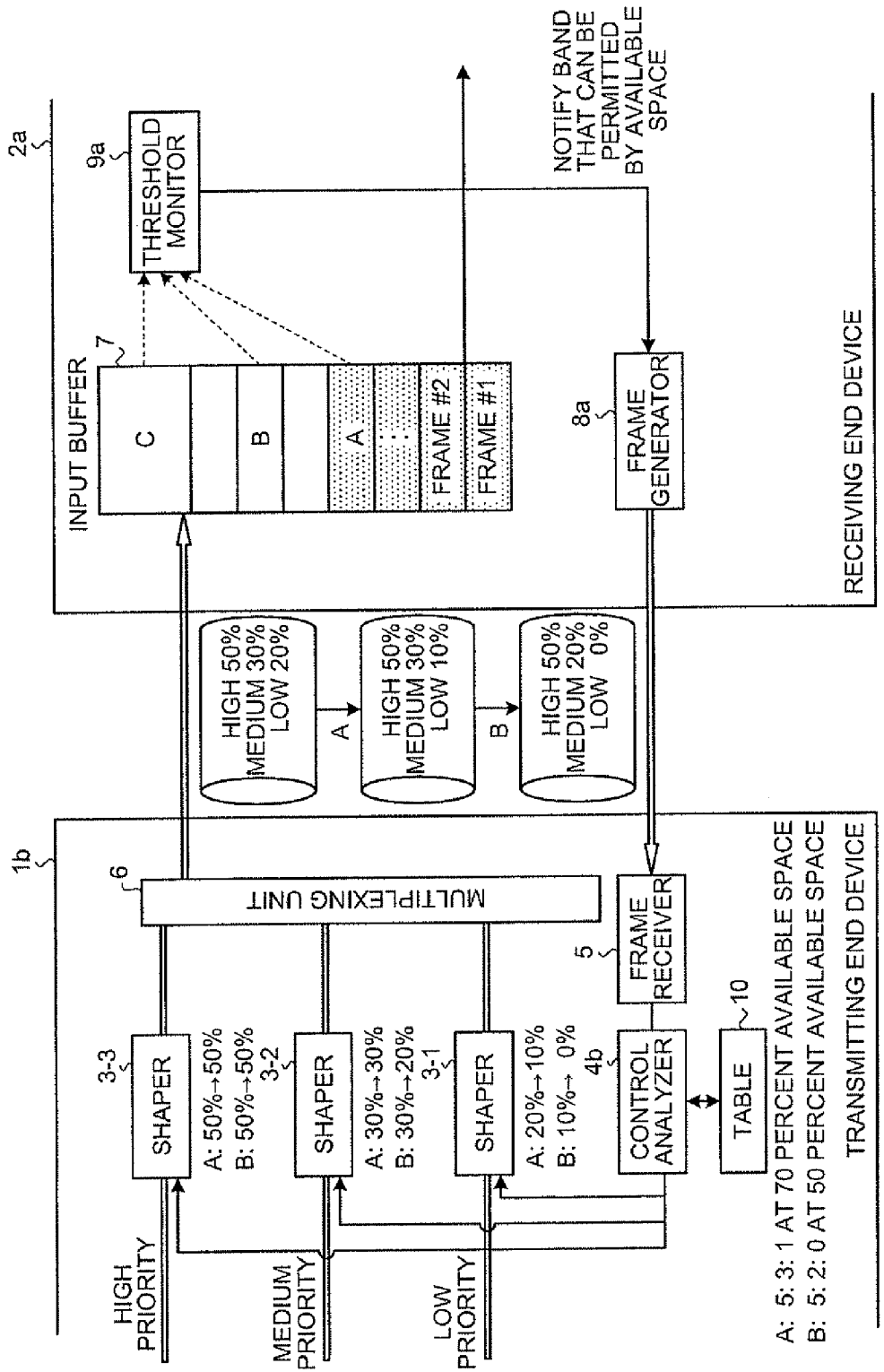
FIG. 8 is a functional block diagram of an example of a communication system according to a third embodiment of the present invention.

FIG. 8 is a functional block diagram of a communication system, which includes the receiving end device according to a third embodiment of the present invention. As shown in FIG. 8, apart from replacing the control analyzer 4 of the transmitting end device 1 according the first embodiment by a control analyzer 4b and adding a table 10, a transmitting end device 1b according to the third embodiment is similar to the transmitting end device 1 according to the first embodiment. The receiving end device 2a according to the third embodiment is similar to the receiving end device 2a according to the second embodiment. Components, which include functions that are similar to the respective functions in the first embodiment or in the second embodiment, are indicated by the same reference numerals, and a detailed description of such components will not be repeated here.

The MAC control operation code field and the stop time period field of the normal pause frame are extended also in the third embodiment to add new control data. The extended pause frame according to the third embodiment is similar to the extended pause frame according to the second embodiment that is shown in FIG. 6.

Similarly as in the first embodiment, three levels of "high priority", "medium priority", and "low priority" are set in the third embodiment as the priority classes. Further, the class division is carried out before inputting the transmission data into the shapers 3-1 to 3-3 of the transmitting end device 1b. Data of "low priority" is input into the shaper 3-1, data of "medium priority" is input into the shaper 3-2, and data of "high priority" is input into the shaper 3-3 for the respective class.

The table 10 of the transmitting end device 1b stores therein an output ratio of each priority class corresponding to the available space in the input buffer that is notified as the input buffer-permissible band value of the extended pause frame. The output ratio is indicated as a ratio when a total output of all the classes during an initial state (when a notification using the extended pause frame or the normal frame is not carried out) is ten. For example, it is assumed that the output ratio during the initial state is 5:3:2 (output ratio sequentially indicates high priority: medium priority: low priority) and the output ratio is prior set in the control analyzer 4b. Further, the table 10 stores therein an output ratio of 5:3:1 that corresponds to the available space of 70 percent and an output ratio of 5:2:0 that corresponds to the available space of 50 percent. The output ratios mentioned earlier are indicated as numerical values when the total output of all the classes during the initial state as ten. For example, because the output ratio is 5:3:1 when the available space is 70 percent, the total output becomes 5+3+1=9 that is 90 percent of the total output during the initial state.

The numerical values of the output ratios mentioned earlier are mere examples, and any ratios can be set as the output ratios. However, it is desirable to set the output ratio such that the ratio of the high priority class is higher.

Figure 9:
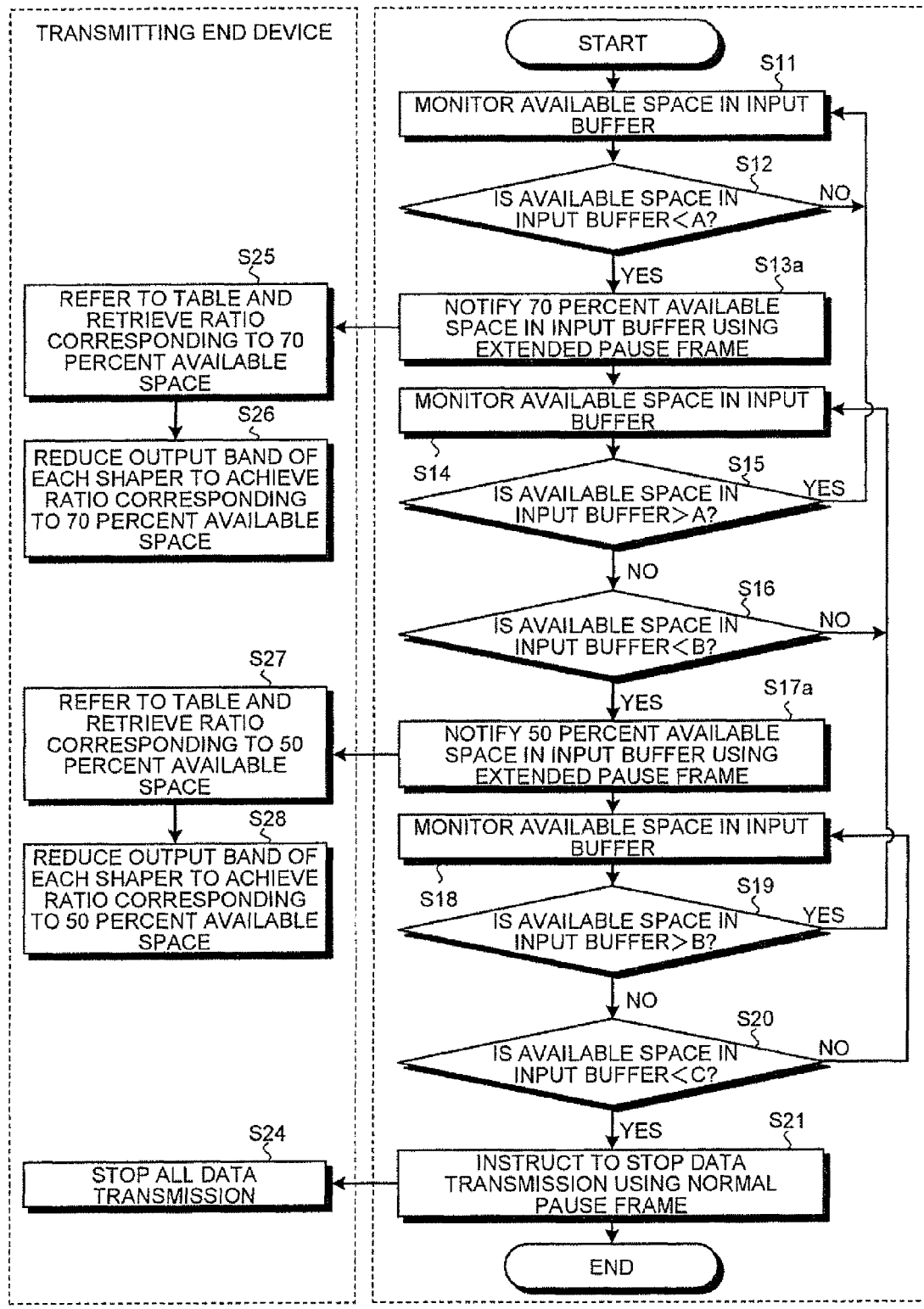
FIG. 9 is a flowchart of a flow control process according to the third embodiment.

A flow control method according to the third embodiment is explained next. FIG. 9 is a flowchart of a flow control process according to the third embodiment. A process, which is executed by the receiving end device 2a according to the third embodiment, is similar to the process that is executed by the receiving end device 2a according to the second embodiment. Explanation of the process, which is similar to the process according to the first or the second embodiment, is omitted, and only a differing portion is explained.

The frame receiver 5 of the transmitting end device 1b receives the extended pause frame that is transmitted at step S13a. The control analyzer 4b reads the input buffer-permissible band value (70 percent in the third embodiment) of the extended pause frame and retrieves by searching the table 10, the output ratio (5:3:1) corresponding to the read input buffer-permissible band value (step S25). Next, the control analyzer 4b sets the output band of the shapers 3-1 to 3-3 to the retrieved output ratio (step S26). To be specific, because the ratios of "high priority" and "medium priority" do not change from the respective ratios during the initial state, settings in the shapers 3-2 and 3-3 are not modified. Because the ratio of "low priority" changes to 1 (ten percent), a band corresponding to ten percent is set in the shaper 3-1. The shaper 3-1 controls the output within the set output band.

The frame receiver 5 of the transmitting end device 1b receives the extended pause frame that is transmitted at step S17a. The control analyzer 4b reads the input buffer-permissible band value (50 percent in the third embodiment) of the extended pause frame and retrieves by searching the table 10, the output ratio (5:2:0) corresponding to the read input buffer-permissible band value (step S27). Next, the control analyzer 4b sets the output bands of the shapers 3-1 to 3-3 to the retrieved output ratio (step S28). The shapers 3-1 to 3-3 control the output within the set output bands. Step S24 of the flow control process is similar to step S24 of the flow control process in the first embodiment.

The structure of the communication system shown in FIG. 8 is used in the third embodiment. However, functions of the frame generator 8a and the threshold monitor 9a of the receiving end device 2a according to the third embodiment can be added to the respective functions of the frame generator 8 and the threshold monitor 9 of the receiving end device 2 according to the first embodiment. Similarly, a function of the control analyzer 4b of the transmitting end device 1b according to the third embodiment can also be added to the function of the control analyzer 4 of the transmitting end device 1 according to the first embodiment. When adding the functions in the third embodiment to the respective functions in the first embodiment, the MAC control operation code that is used in the extended pause frame in the first embodiment and the MAC control operation code that is used in the extended pause frame in the third embodiment are defined as different numerical values (for example, the extended pause frame in the first embodiment is set to "0x8003" and the extended pause frame in the third embodiment is set to "0x8002"). Next, the threshold monitor 9a of the receiving end device 2a selects to transmit any one of the extended pause frames. After selecting the extended pause frame, the threshold monitor 9a executes the flow control process that is similar to the flow control process according to the first embodiment or according to the third embodiment.

In the third embodiment mentioned earlier, the MAC control operation code of the normal pause frame is extended to define the extended pause frame that is similar to the extended pause frame according to the second embodiment, and the receiving end device 2a transmits the extended pause frame based on the available space in the input buffer 7. Further, the transmitting end device 1b maintains as the table 10, a correspondence between the input buffer-permissible band value and the output ratio of each class, and, controls the bands using the output ratio corresponding to the input buffer-permissible band value included in the extended pause frame. Due to this, a detailed flow control based on the priority can be exercised.

Figure 10:
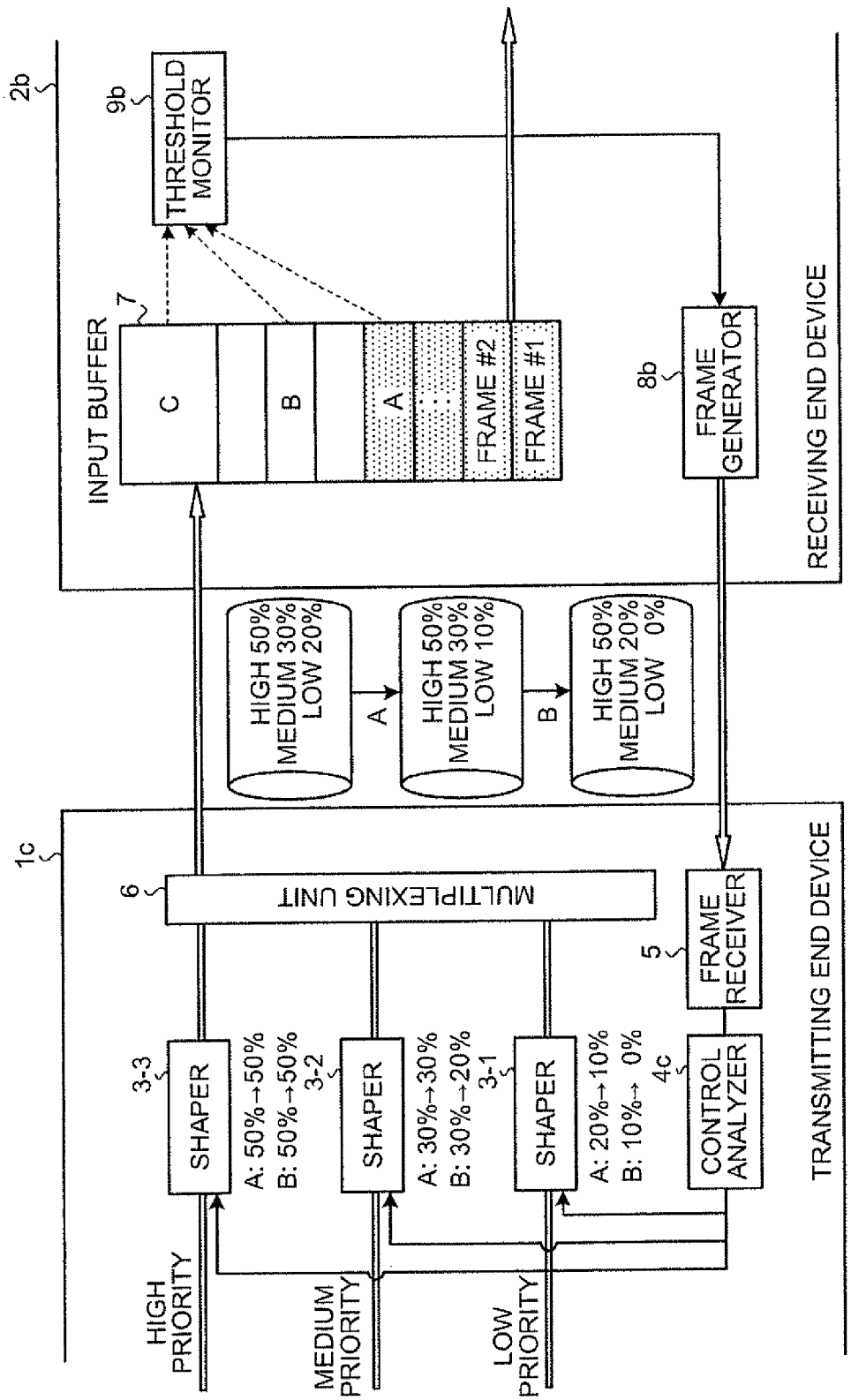
FIG. 10 is a functional block diagram of an example of a communication system according to a fourth embodiment of the present invention.

FIG. 10 is a functional block diagram of a communication system, which includes the receiving end device according to a fourth embodiment of the present invention. As shown in FIG. 10, apart from replacing the control analyzer 4 of the transmitting end device 1 according to the first embodiment by a control analyzer 4c, a transmitting end device 1c according to the fourth embodiment is similar to the transmitting end device 1 according to the first embodiment. Further, apart from replacing the frame generator 8 and the threshold monitor 9 of the receiving end device 2 according to the first embodiment by a frame generator 8b and a threshold monitor 9b respectively, a receiving end device 2b according to the fourth embodiment is similar to the receiving end device 2 according to the first embodiment. Components, which include functions that are similar to the respective functions in the first embodiment, are indicated by the same reference numerals and description of such components will not be repeated here.

The MAC control operation code field and the stop time period field of the normal pause frame are extended also in the fourth embodiment to add new control data. FIG. 11 is a schematic of an example of the pause frame extension according to the fourth embodiment.

In the extended pause frame according to the fourth embodiment, a numerical value such as "0x8003", which indicates the extended pause frame, is set as the opcode that is used in the MAC control operation code field. The numerical value "0x8003" is only an example, and any numerical value, which is not redundant with an already existing opcode, can be used.

In the extended pause frame according to the fourth embodiment, the stop time period field of the normal pause frame is divided into two fields, the control target class field and a band setting value field. Similarly as in the first embodiment, the class in the fourth embodiment indicates a priority. In the fourth embodiment, three levels of "high priority", "medium priority", and "low priority" are used as the priority classes. The control target class indicates a class in which the band is set using the respective extended pause frame. A band setting value is a numerical value, which indicates as a ratio, the band that is set with respect to the class that is specified in the control target class field.

The band setting value is the ratio when the total output of all the classes during the initial state (when the notification using the extended pause frame or the normal pause frame is not carried out) of the transmitting end device 1c is 100 percent. The output ratio of high priority: medium priority: low priority during the initial state of the transmitting end device 1c is 5 (50 percent):3 (30 percent):2 (20 percent).

For setting the ratio of the bands, which differ for each class according to the available space of the input buffer 7, the transmitting end device 1b explained in the third embodiment prior stores therein the table 10. The ratio of the bands, which differ for each priority class according to the available space of the input buffer 7, is also set in the fourth embodiment. However, in the fourth embodiment, the band for each control target class can be set using the extended pause frame. Due to this, the transmitting end device 1c does not need to maintain the table 10.

Even in the fourth embodiment, the class division is carried out before inputting the transmission data into the shapers 3-1 to 3-3 of the transmitting end device 1b. Data of "low priority" is input into the shaper 3-1, data of "medium priority" is input into the shaper 3-2, and data of "high priority" is input into the shaper 3-3 for each class.

Figure 12:
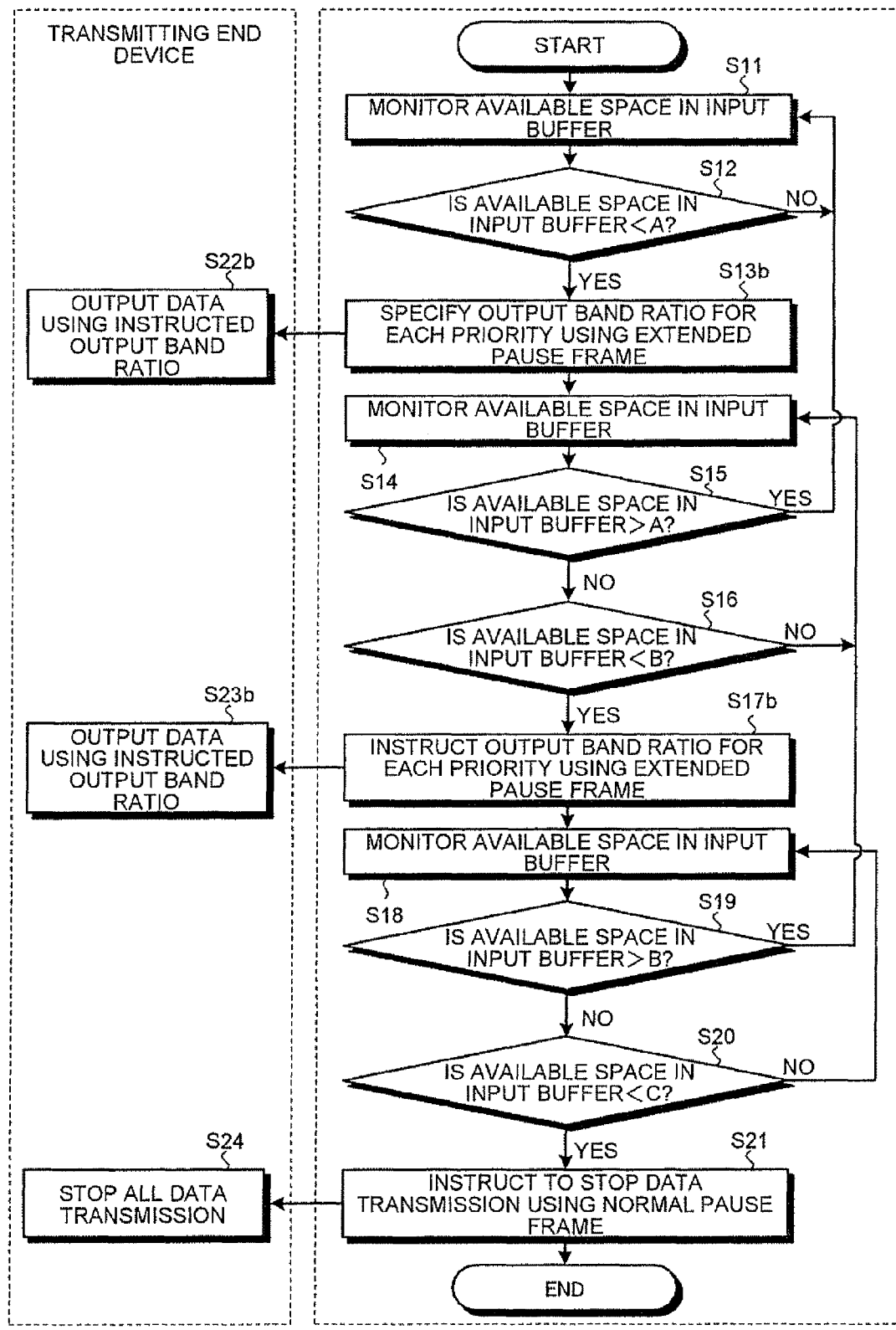
FIG. 12 is a flowchart of a flow control process according to the fourth embodiment.

A flow control method according to the fourth embodiment is explained next. FIG. 12 is a flowchart of a flow control process according to the fourth embodiment. Similarly as in the first embodiment, in the fourth embodiment, the three types of thresholds are prior set with respect to the available space of the input buffer 7 of the receiving end device 2. The threshold monitor 9b maintains the three types of thresholds. A, B, and C are the three thresholds such that A>B>C. The output ratios (the output ratios that are instructed to the transmitting end device 1c) for each priority class corresponding to the respective thresholds A and B are prior set and the output ratios are maintained by the threshold monitor 9b. For example, it is assumed that an output ratio of 5:3:1 (high priority: medium priority: low priority) corresponds to the threshold A and an output ratio of 5:2:0 corresponds to the threshold B. However, the output ratios mentioned earlier are mere examples, and similarly as in the third embodiment, any ratios can be used.

A portion of the flow control process, which differs from any one of the flow control processes according to the first to the third embodiments, is explained next. Steps S11 and S12 are similar to the respective steps S11 and S12 of the flow control process according to the first embodiment. Upon determining at step S12 that the available space in the input buffer 7 is less than the threshold A (Yes at step S12), the threshold monitor 9b instructs the frame generator 8b to transmit the extended pause frame for instructing to set the output ratio to 5 (50 percent):3 (30 percent):1 (10 percent). First, the frame generator 8b first sets "0x8003" (the opcode that indicates the extended pause frame) in the MAC control operation code field, sets the control target class to "low priority", sets the band setting value to "ten percent", and transmits the extended pause frame to the transmitting end device 1c (step S13b).

The output bands for "high priority" class and "medium priority" class are the same as the respective output bands during the initial state. Due to this, the bands for "high priority" class and "medium priority" class are not set using the extended pause frame. If the output bands differ from the respective output bands during the initial state, the bands of "high priority" class and "low priority" class are similarly set using the extended pause frame.

Steps S14 to S16 are similar to steps S14 to S16 of the flow control process in the first embodiment. Upon determining, at step S16, that the available space in the input buffer 7 is less than the threshold B (Yes at step S16), the threshold monitor 9b instructs the frame generator 8b to transmit the extended pause frame for instructing to set the output ratio to 5 (50 percent):2 (20 percent):0 (zero percent). First, the frame generator 8b sets "0x8003" in the MAC control operation code field, sets the control target class to "low priority", sets the band setting value to "zero percent", and transmits the extended pause frame to the transmitting end device 1c. Further, the frame generator 8b sets "0x8003" in the MAC control operation code field, sets the control target class to "medium priority", sets the band setting value to "20 percent", and transmits the extended pause frame to the transmitting end device 1c (step S17b). Steps S18 to S21 are similar to steps S18 to S21 of the flow control process in the first embodiment.

Upon receiving the extended pause frame that is transmitted at step S13b, the transmitting end device 1c sets the output of the shaper 3-1 to ten percent (step S22b). To be specific, first the frame receiver 5 receives the extended pause frame. The control analyzer 4c analyzes the contents of the received extended pause frame. Because the control target class is set to "low priority" and the band setting value is set to "ten percent", the control analyzer 4c sets the output band of the shaper 3-1 to a numerical value corresponding to ten percent. The shaper 3-1 controls the output within the set output band.

Upon receiving the extended pause frame that is transmitted at step S17b, the transmitting end device 1c sets the output band of the shaper 3-1 to zero percent and sets the output band of the shaper 3-2 to 20 percent (step S23b). To be specific, first the frame receiver 5 receives the extended pause frame. The control analyzer 4c analyzes the contents of the received extended pause frame. Because the control target class is set to "low priority" and the band setting value is set to "zero percent, the control analyzer 4c transmits to the shaper 3-1, an instruction to stop the output. The shaper 3-1 stops the output.

The control analyzer 4c analyzes the contents of the next received extended pause frame. Because the control target class is set to "medium priority" and the band setting value is set to "20 percent", the control analyzer 4c sets the output band of the shaper 3-2 to a numerical value corresponding to 20 percent. The shaper 3-2 controls the output within the set band. Step S24 of the flow control process is similar to step S24 of the flow control process in the first embodiment.

Functions of the frame generator 8b and the threshold monitor 9b of the receiving end device 2b according to the fourth embodiment can be added to the respective functions of the frame generator 8 and the threshold monitor 9 of the receiving end device 2 according to the first embodiment. Similarly, a function of the control analyzer 4c of the transmitting end device 1c according to the fourth embodiment can also be added to the function of the control analyzer 4 of the transmitting end device 1 according to the first embodiment. When adding the functions in the fourth embodiment to the respective functions in the first embodiment, the MAC control operation code that is used in the extended pause frame in the first embodiment and the MAC control operation code that is used in the extended pause frame in the fourth embodiment are defined as different numerical values (for example, the extended pause frame in the first embodiment is set to "0x8003" and the extended pause frame in the fourth embodiment is set to "0x8002"). The threshold monitor 9b of the receiving end device 2 selects to transmit any one of the extended pause frames. After selecting the extended pause frame, the threshold monitor 9b executes the flow control process that is similar to the flow control process according to the first embodiment or according to the fourth embodiment.

The functions in the fourth embodiment can be similarly added to the respective functions in the second embodiment or in the third embodiment. When adding the functions in the fourth embodiment to the respective functions in the second embodiment or in the third embodiment, the MAC control operation code of the extended pause frame in the fourth embodiment is set to a numerical value such as "0x8004" that differs from the MAC control operation code in the second embodiment or in the third embodiment.

In the fourth embodiment mentioned earlier, the control target class and the band setting value can be specified by extending the MAC control operation code of the normal pause frame, and based on the available space in the input buffer 7, the receiving end device 2b transmits the extended pause frame. Further, the transmitting end device 1c controls the band using the output ratio corresponding to control target class and the band setting value. Due to this, the transmitting end device 1c can exercise a precise flow control based on priority by using data of the extended pause frame.

According to an embodiment of the present invention, based on a priority class and an available space in an input buffer, a precise control can be exercised, frame rejection due to backpressure can be curbed, and a service class can be maintained.

According to an embodiment of the present invention, based on a simple operation of whether to stop an output, a transmitting end device can exercise output control of a transmitting end for each priority class. Due to this, frame rejection can be curbed and the service class can be maintained.

According to an embodiment of the present invention, based on the available space in the input buffer of a receiving end device, the transmitting end device can exercise a precise output control, and frame rejection can be curbed.

According to an embodiment of the present invention, a precise output control can be exercised according to the priority class, frame rejection can be curbed, and the service class can be maintained.

According to an embodiment of the present invention, using only data of an extended pause frame, the transmitting end device can exercise a precise band control for each class. Thus, frame rejection can be curbed, and the service class can be maintained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for executing flow control of data having a plurality of priority classes between a receiving end device and a transmitting end device, comprising:

monitoring an input buffer to determine whether an available space in the input buffer is less than a threshold, wherein the input buffer is disposed in the receiving end device and stores therein the data from the transmitting end device;

transmitting an extended pause frame having a MAC control code field and a stop time period field to the transmitting end device in the receiving end device upon determining that the available space in the input buffer is less than the threshold, wherein an identifier indicating the extended pause frame is set in the MAC control code field, and a ratio of the available space in the input buffer to a total capacity of the input buffer is set in the stop time period field based on the available space in the input buffer; and reducing, using a processor, a band for all the priority classes based on the ratio in the stop time period field of the extended pause frame in the transmitting end device.

2. A method for executing flow control of data having a plurality of priority classes between a receiving end device and a transmitting end device, comprising:

storing output band ratio data indicating a correspondence between an output band ratio for each of the priority classes and a ratio of an available space in an input buffer to a total capacity of the input buffer, wherein the input buffer is disposed in the receiving end device and stores therein the data from the transmitting end device;

monitoring the input buffer to determine whether the available space in the input buffer is less than a threshold;

transmitting an extended pause frame having a MAC control code field and a stop time period field to the transmitting end device in the receiving end device upon determining that the available space in the input buffer is less than the threshold, wherein an identifier indicating the extended pause frame is set in the MAC control code field, and the ratio of the available space in the input buffer to the total capacity of the input buffer is set in the stop time period field based on the available space in the input buffer;

searching the output band ratio data for the output band ratio, the output band ratio corresponding to the ratio of the available space in the input buffer to the total capacity of the input buffer included in the extended pause frame, and reading the output band ratio; and setting, using a processor, a band value of each of the priority classes based on the read output band ratio in the transmitting end device.

3. A method for executing flow control of data having a plurality of priority classes between a receiving end device and a transmitting end device, comprising:

monitoring an input buffer to determine whether an available space in the input buffer is less than a threshold, wherein the input buffer is disposed in the receiving end device and stores therein the data from the transmitting end device;

transmitting an extended pause frame having a MAC control code field and a stop time period field to the transmitting end device in the receiving end device upon determining that the available space in the input buffer is less than the threshold, wherein an identifier indicating the extended pause frame is set in the MAC control code field, and a control target class specifying at least one of the priority classes and a band setting value corresponding to the control target class are set in the stop time period field based on the available space in the input buffer; and setting, using a processor, a band for each of the priority classes, specified as the control target class in the extended pause frame based on the band setting value of the extended pause frame in the transmitting end device.

4. The method of flow control according to claim 3, wherein the output control data defines a control target class specifying at least one of the priority classes to stop an output of the data from the transmitting end device based on the output control data, and the output of the data corresponding to the control target class specified by the extended pause frame, is stopped at the performing the band control.

* * * * *